United States Patent
Adams et al.

(10) Patent No.: US 6,466,412 B1
(45) Date of Patent: Oct. 15, 2002

(54) HEAD SUSPENSION HAVING TAPERED PROCESSING HOLES AND METHOD FOR ALIGNING TOOLING DURING SUSPENSION MANUFACTURE

(75) Inventors: Kent M. Adams, Eau Claire; Michael L. Gruber, Chippewa Falls; Michael T. Haapala, Eau Claire; Aaron J. Halberg, Hayward; John D. Hutchison, Menomonie; Steven G. O'Brien, Fall Creek, all of WI (US); Raymond R. Wolter, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 09/557,368

(22) Filed: Apr. 25, 2000

Related U.S. Application Data

(60) Provisional application No. 60/131,096, filed on Apr. 26, 1999.

(51) Int. Cl.⁷ .............................. G11B 5/50; G11B 5/48
(52) U.S. Cl. ............................. 360/245.2; 360/244.5; 360/244.8; 360/244.9; 360/245.3
(58) Field of Search ................... 360/245.2, 244.2, 360/244.5, 244.8, 244.9, 245, 245.3

(56) References Cited

U.S. PATENT DOCUMENTS

| | | | |
|---|---|---|---|
| 4,235,664 A | 11/1980 | Menke | 216/41 |
| 4,251,318 A | 2/1981 | Oberg et al. | 216/41 |
| 5,846,442 A | 12/1998 | Pasco | 216/41 |
| 5,886,857 A * | 3/1999 | Symons | 360/245.2 |
| 6,052,258 A * | 4/2000 | Albrecht et al. | 360/245.2 |
| 6,055,133 A * | 4/2000 | Albrecht et al. | 360/104 |
| 6,195,236 B1 * | 2/2001 | Hiraoka et al. | 360/244.5 |
| 6,278,587 B1 * | 8/2001 | Mei | 360/294.6 |

* cited by examiner

Primary Examiner—Jefferson Evans
(74) Attorney, Agent, or Firm—Faigre & Benson LLP

(57) ABSTRACT

A head suspension for a rigid disk drive comprising one or more tapered processing holes in the load beam. The tapered processing holes can be located in the rigid region, the flexure or the mounting region. The tapered processing holes have a first diameter at a first surface of the load beam and a second diameter at a second surface of the load beam, wherein the first diameter is less than the second diameter. A method of processing a head suspension for a rigid disk drive is also disclosed. A processing tool is operatively engaging with the tapered processing hole to perform one of mechanically or optically locating, measuring. mounting, and/or aligning a suspension arm or components thereof.

30 Claims, 5 Drawing Sheets

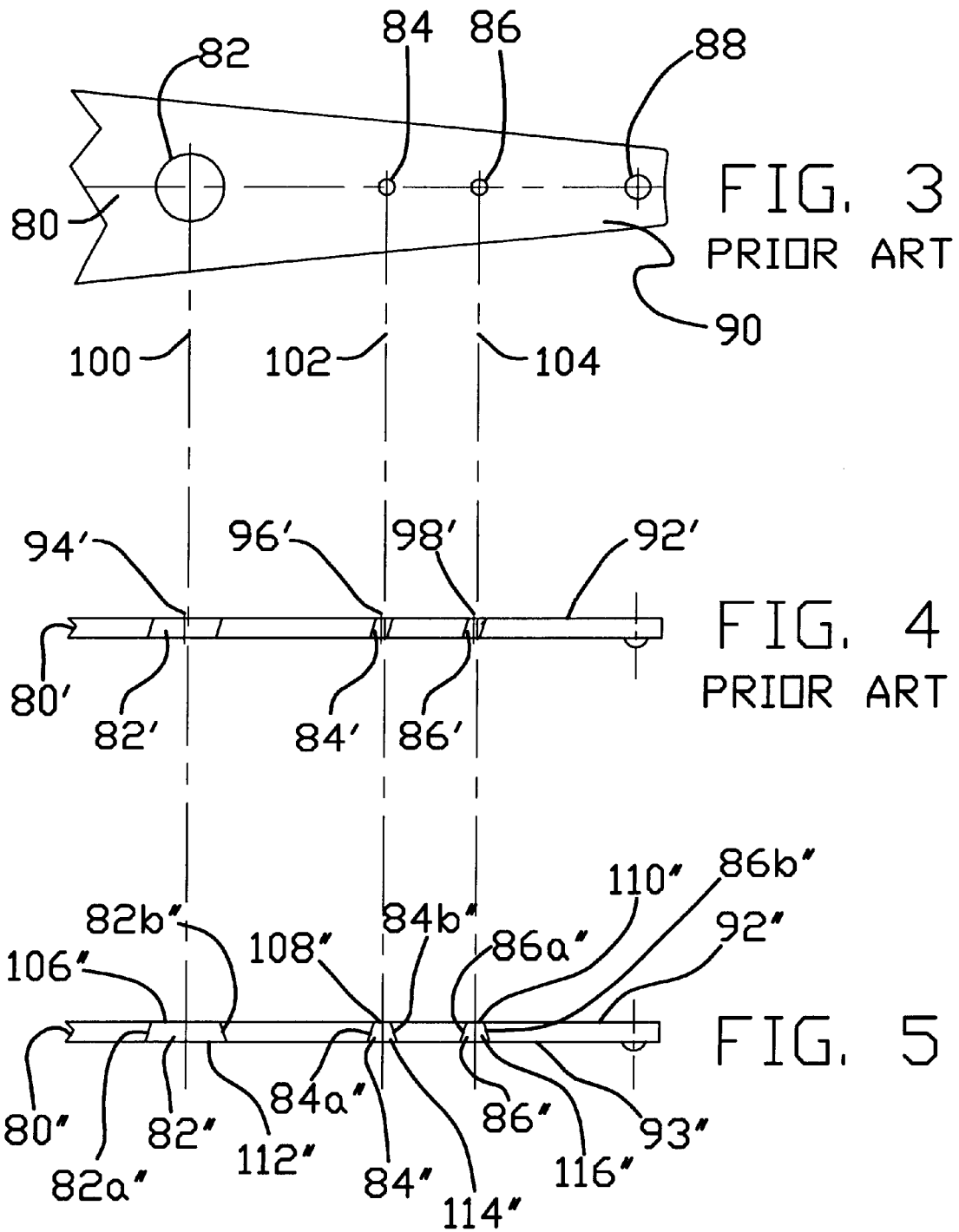

HEAD SUSPENSION HAVING TAPERED PROCESSING HOLES AND METHOD FOR ALIGNING TOOLING DURING SUSPENSION MANUFACTURE

This application claims the benefit of U.S. Provisional Application Ser. No. 60/131,096 filed Apr. 26, 1999.

FIELD OF THE INVENTION

The present invention is directed to tapered processing holes for a head suspension in a rigid disk drive and to a method for processing head suspensions using the tapered processing holes.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk that is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider-mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension, the flexure is formed as a separate piece having a load beam-mounting region that is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

The actuator arm is coupled to an electromechanical actuator that operates within a negative feedback, closed-loop servo system. The actuator moves the data head radially over the disk surface for track seek operations and holds the transducer directly over a track on the disk surface for track following operations.

The head suspensions are typically formed from a sheet of metal using single step or multi-step etching procedures, such as disclosed in U.S. Pat. Nos. 4,235,664; 4,251,318; and 5,846,442. The etching procedure generally includes coating both sides of the sheet material with a photo resist; locating a photo mask on both sides of the metal sheet; exposing the photo resist through the photo mask; developing the photo resist and etching the desired feature. However, since suspension components are made by etching simultaneously from both sides of the sheet material, misregistration of the photo mask during exposure causes a shift between the top and bottom of any processing holes in the component. Consequently, the center for the best fit perpendicular cylinder in the processing hole may not align with the center of the processing hole. For example, rather than having a center axis perpendicular to the surfaces of the sheet material, processing holes can be skewed, having a cross sectional shape of a parallelogram rather than rectangular. Consequently, when such processing holes are engaged with a processing tool, such as an alignment pin, the center line of the processing tool will be misregistered with respect to the center line of the processing hole.

Therefore, a need exists for improved processing holes for head suspensions and for an improved method of processing head suspensions using such processing holes.

BRIEF SUMMARY OF THE INVENTION

The present invention is directed to a head suspension for a rigid disk drive comprising one or more tapered processing holes in the load beam. The tapered processing holes can be located in the rigid region, the flexure or the mounting region. The tapered processing holes comprise a first diameter at a first surface of the load beam and a second diameter at a second surface of the load beam, wherein the first diameter is less than the second diameter.

The tapered processing holes are formed by etching. The tapered processing holes comprise side walls forming an angle with respect to a first surface of the load beam of less than about 85 degrees. In one embodiment, the angle is between about 75 degrees and about 85 degrees. The processing hole will comprise a generally conical or frusto-conical shape, although the shape may be asymmetrical due to processing variability.

In another aspect of the present invention, a method of processing a head suspension for a rigid disk drive is disclosed. A head suspension is provided having a load beam having a mounting region, a rigid region and a spring region located between the mounting region and rigid region. The head suspension has at least one tapered processing hole comprises a first diameter at a first surface of the load beam and a second diameter at a second surface of the load beam, wherein the first diameter is less than the second diameter. A processing tool is operatively engaged with the tapered processing hole to perform one of mechanically or optically locating, measuring, mounting, and/or aligning a suspension arm or components thereof. A plurality of processing devices can be operatively engaged with a plurality of tapered processing holes.

The processing tool is typically inserted through the first surface into the tapered processing hole. The processing tool can be a tapered processing tool, a straight tool, a machine vision system, or the like.

The tapered processing hole is formed by etching. A photo mask is located along the first and second surfaces of the load beam prior to etching the tapered processing hole.

The tapered processing hole can be used as a reference point for measuring locations on the head suspension. For example, another component can be aligned to the head suspension relative to the location of the tapered processing hole. Alternatively, a tapered processing hole on another component can be aligned with the tapered processing hole on the load beam. For example, a tapered processing hole on a flexure can be aligned relative to the tapered processing hole on the load beam. In another embodiment, a processing device is aligned with the tapered processing hole on a feature forming tool and a feature is formed in the load beam, such as a dimple on the load beam.

BRIEF DESCRIPTION OF THE SEVERAL VIEWS OF THE DRAWING

FIG. 3 is a schematic illustration of a generic suspension arm.

FIG. 4 is a side sectional view of conventional processing holes formed in the suspension arm of FIG. 3.

FIG. 5 is a side sectional view of tapered processing holes in accordance with the present invention formed in the suspension arm of FIG. 3.

DETAILED DESCRIPTION OF THE INVENTION

Figure 1:
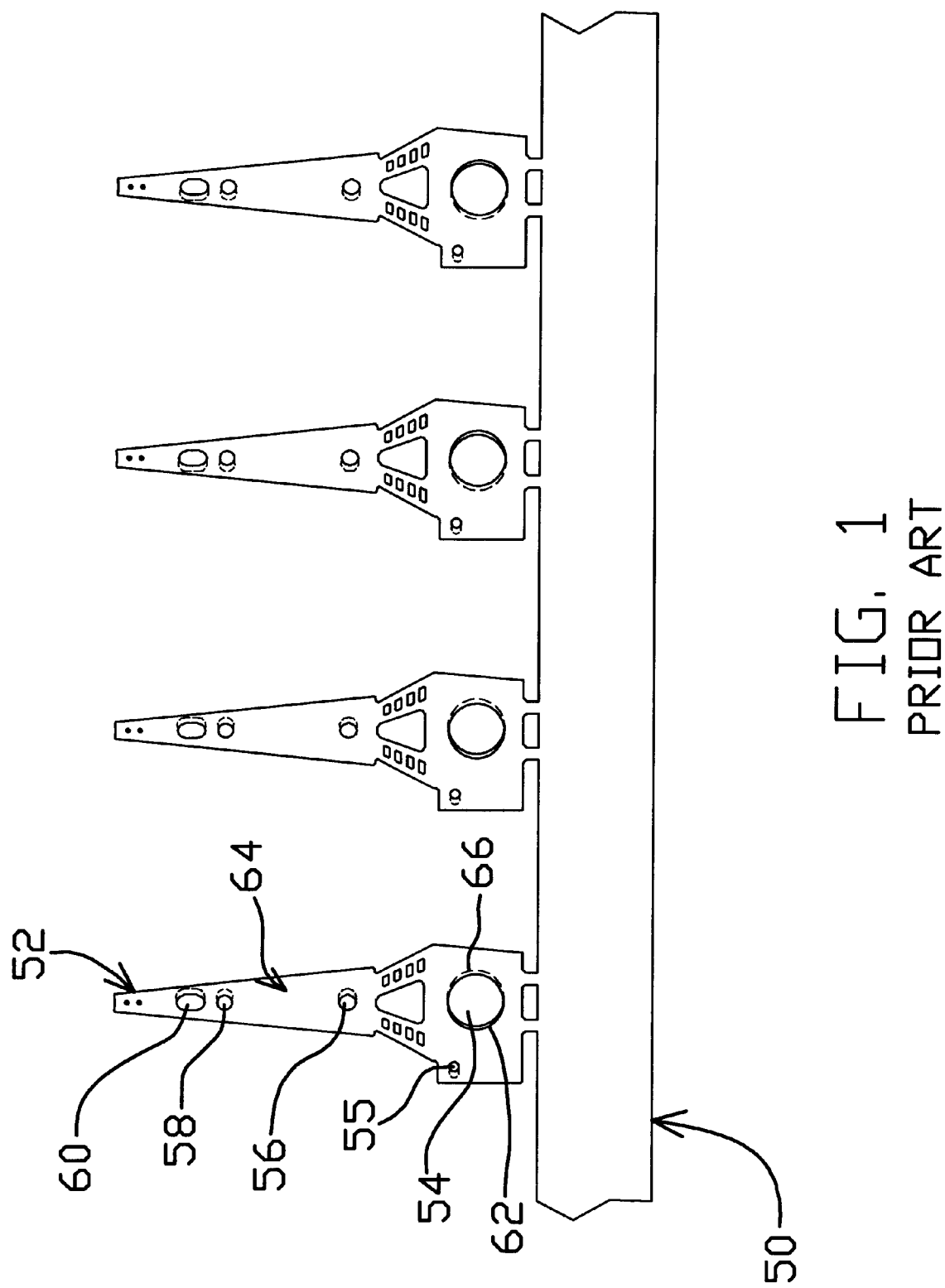
FIG. 1 is a plan view of a carrier strip having a plurality of suspension arms.

FIG. 1 illustrates a carrier strip 50 having a plurality of suspension arms 52. The suspension arms 52 include a series of processing holes 54, 55, 56, 58, 60 that were generated as a result of misalignment of the photo tools. Misalignment of the processing hole 54 is shown by a lack of concentricity between the entrance 62 to the hole 54 along the first surface 64 and the exit 66 of the hole 54. The same lack of concentricity is illustrated in the processing holes 55, 56, 58, and 60.

Figure 2:
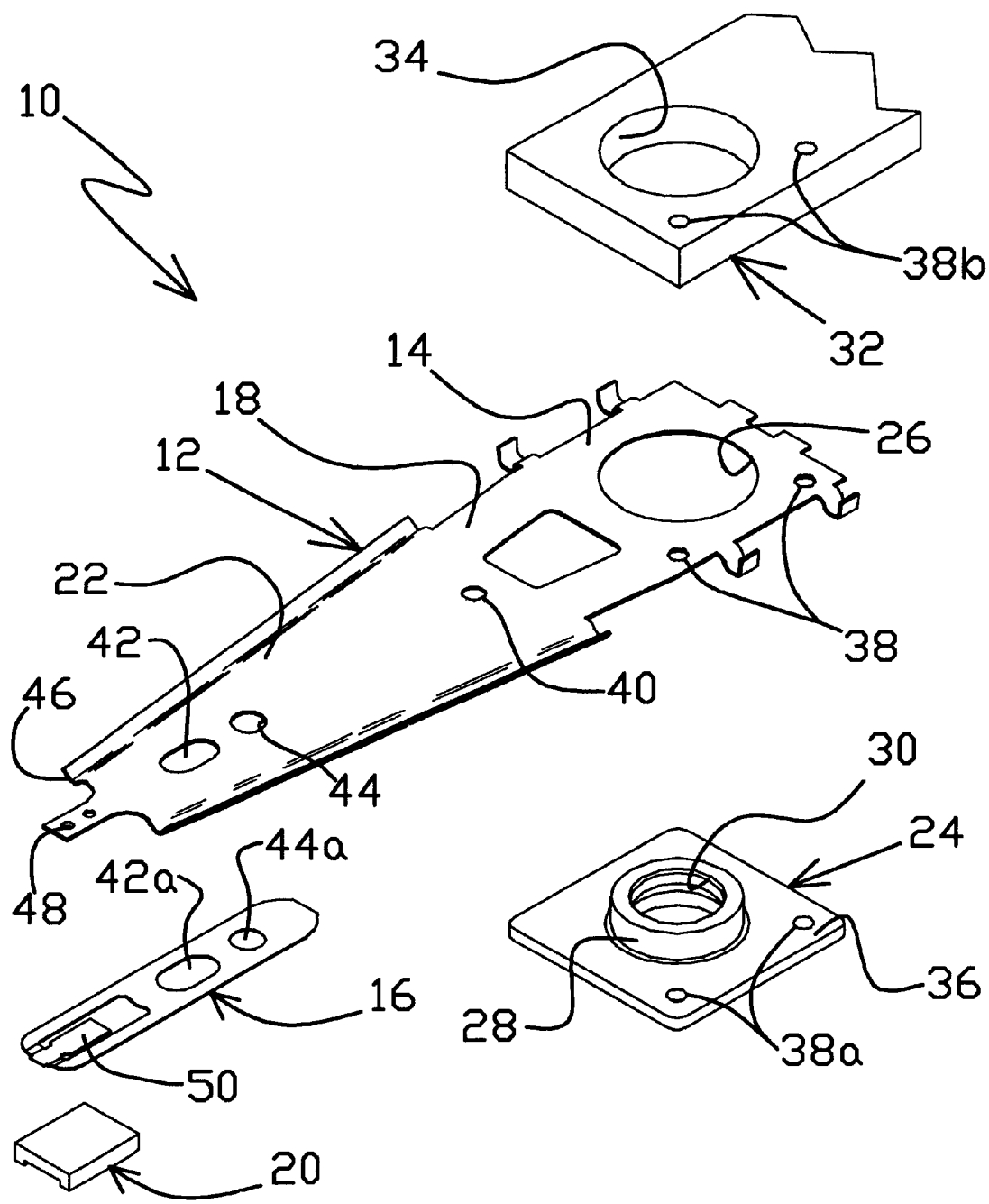
FIG. 2 is a perspective view of head suspension assembly in accordance with the present invention.

FIG. 2 is an exploded, isometric view of a head suspension assembly 10 having various tapered processing holes for use with processing tools in accordance with the present invention, as will be discussed below. As used herein, "tapered" refers to a hole having an opening along a first surface of a sheet material with a diameter greater than the diameter of the opening along a second surface of the sheet material. Alternatively, tapered can be viewed as a shape generally corresponding to a cross-section of a cone, although due to processing variability the taper of the side walls may not be symmetrical. A "processing hole" refers to any hole used for mechanically or optically locating, measuring, mounting, and/or aligning a suspension arm or components thereof. A "processing tool" refers to a mechanical or optical mechanism that uses a processing hole for locating, measuring, mounting and/or aligning a suspension arm or components thereof.

The head suspension assembly 10 includes a load beam 12 with. a flexure 16 to which a head slider 20 having a read/write element or head is to be mounted. The load beam 12 includes a mounting region 14 at a proximal end, a rigid region 22 adjacent to a distal end and a spring region 18 between the mounting region and rigid region. Spring region 18 is relatively resilient and provides a downward bias force at the distal tip of load beam 12 for holding the read/write head near a spinning disk in opposition to an upward force created by an air bearing over the disk. The flexure 16 is to allow pitch and roll motion of head slider 20 and read/write head as they move over the data tracks of the disk. The head suspension assembly 10 is typically coupled to the actuator via the actuator arm 32 that is attached to the mounting 14 region of load beam 12.

A swage type attachment is commonly used to couple the mounting region of a load beam to an actuator arm. To swage load beam 12 to actuator arm 32, actuator arm 32 and mounting region 14 include apertures 34 and 26, respectively. A base plate 24 having a boss tower 28 with a swage hole 30 extending therethrough and, typically, a square flange 36 is welded or otherwise attached to a bottom face of mounting region 14 of load beam 12. Boss tower 28 is then inserted through actuator arm aperture 34. A swage ball is then forced through swage hole 30 in boss tower 28 causing boss tower 28 to expand in actuator arm aperture 34. This creates a frictional attachment interface between the exterior surface of boss tower 28 and the interior surface of actuator arm aperture 34.

The aperture 26 is a tapered processing hole that can optionally be used to align the head suspension assembly 10 with boss tower 28. In addition to aperture 26, the load beam 12 typically includes one or more tapered processing holes 38, 40, 42, 44. The tapered processing hole 38 is useful for aligning the load beam 12 with the base plate 24 and/or actuator arm 32. The base plate 24 and/or actuator arm 32 may optionally include corresponding processing holes 38a, 38b to facilitate alignment.

The load beam 12 also includes one or more tapered processing holes 40 near the spring region 18 and one or more tapered processing holes 42, 44 near distal end 46. The tapered processing holes 40, 42, 44 can be used to align the load beam 12 with a fixture or with other components, such as the base plate 24, the flexure 16, and/or the slider 20. The processing holes 42, 44 can also be aligned with corresponding processing holes 42a, 44a on another component, such as flexure 16. Additionally, the tapered processing holes 40, 42, 44 can be used to register the load beam 12 in a fixture for a feature forming process, such as forming dimple 48 on distal end 46. Any of the processing holes 26, 38, 40, 42, 44 can be used as reference locations for measuring feature locations on the load beam 12.

FIG. 3 is a top schematic view of a suspension arm 80 having processing holes 82, 84, 86. Dimple 88 is located near distal end 90 of the suspension arm 80. Each of the processing holes 82, 84, 86 has a central axis 100, 102, 104, respectively.

FIG. 4 is a side sectional view of a suspension arm 80' having processing holes 82', 84', 86' formed using conventional photo etching techniques. The suspension arm 80' is aligned with the suspension arm 80 to show the relative positioning of the respective processing holes. As a result of misalignment of the upper and lower photo masks, the processing holes 82', 84', 86' are slanted or skewed with respect to first surface 92'. That is, the centerline of the processing holes 82', 84', 86' are not perpendicular to the first surface 92'. A best fit cylinder located in the processing holes 82', 84', 86' would have center axes 94', 96', 98', respectively, offset from the center axes 100, 102, 104 of the processing holes 82, 84, 86. The offset between the axes 94', 96', 98' with respect to the axes 100, 102, 104, respectively, represents misregistration of the processing holes 82', 84', 86'. This misregistration will occur regardless of which surface of the head suspension 80' is used for registering with processing tools.

FIG. 5 illustrates an alternate cross section of a head suspension 80' having a series of tapered processing holes 82", 84", 86". The center axes of a best fit cylinder located in the processing holes 82", 84", 86" will correspond with the axes 100, 102, 104 of the processing holes 80, 84, 86 of the head suspension 80.

The processing holes 82", 84" and 86" have a smaller diameter 106", 108", 110" at the first surface 92", respectively, than the diameters 112", 114", 116" along the second surface 93". The etched-through processing holes 82", 84", 86" also have sloped side surfaces 82a", 82b", 84"a, 84"b, 86"a, 86"b so that even if the top and bottom photo tools are misregistered, only the small diameter holes 106", 108", 110" along the first surface 92" are used as the controlling feature of the processing hole 82", 84", 86". Consequently, the center of the best fit perpendicular cylinder will align with the center of the tapered processing holes 82", 84", 86" along axes 100, 102, 104. The sloped side surfaces 82a". 82b", 84"a, 84"b, 86"a, 86"b are not necessarily symmetrical due to misalignment of the photo tools during the step of exposing the photo resist through the photo tools. That is, the slope of a given side surface may vary around the diameter of the processing hole 82", 84" and 86".

Figure 6:
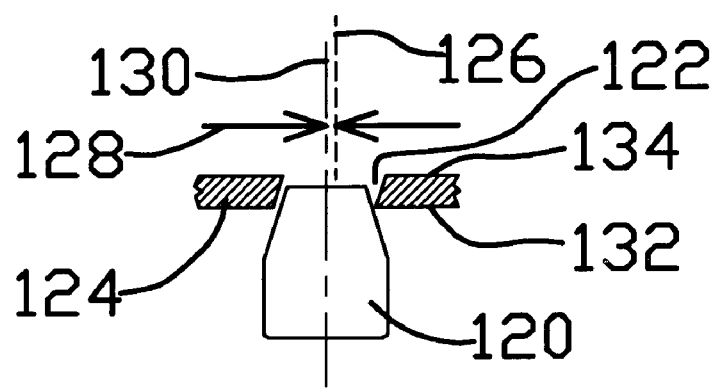
FIG. 6 is a side sectional view of misregistration between a processing tool and a conventional processing hole.

FIG. 6 is a side sectional view of a processing tool 120, such as an alignment pin, engaged with a processing hole 122 and a load beam 124 of a head suspension. The processing hole 122 was formed using conventional techniques, As a result of misalignment of the upper and lower photo tools, the center line 126 of the processing hole 122 is offset by a distance 128 from center line 130 of the alignment pin 120. The distance 128 represents that quantity of misregistrition of the alignment pin 120 relative to the load beam 124. Since the diameter of the processing hole 122 is the same along both the first surface 132 and the second surface 134, the indicated misalignment 128 would be present regardless of whether the alignment pin 120 was inserted through the first surface 132 or the second surface 134.

Figure 7:
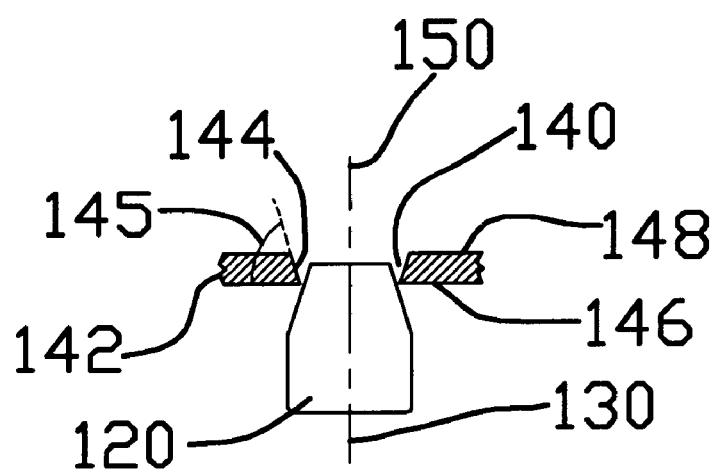
FIG. 7 is a side sectional view of registration between a processing tool and a tapered processing hole in accordance with the present invention.

FIG. 7 illustrates the alignment pin 120 engaging with a processing hole 140 formed in a load beam 142 in accordance with the present invention. The processing hole 140 has tapered side walls 144 forming an angle 145 with the first surface 146 of less than about 85 degrees. In one embodiment, the angle 145 is between about 75 degrees and about 85 degrees. The diameter of the processing hole 140 along first surface 146 is smaller than the diameter along the second surface 148. Consequently, centerline 150 of the processing hole 140 is co-linear with centerline 130 of the alignment pin 120. Although the alignment pin 120 is illustrated as tapered, the present tapered processing hole 140 will also achieve accurate registration with a cylindrical alignment pin.

EXAMPLE

Head suspensions for disk drives typically include a stamped hemispherical shaped feature or dimple in the distal end of the loadbeam. In order accurately stamp the dimple, the stamping die locates the part datum structure by using one or more of the processing holes in the head suspension. Once the part is located, the die stamps in the dimple feature. The dimple is then measured relative to its datum structure using a vision system. The vision system measures X and Y axis shifts in the stamped dimple verses the true datum structure—where the X axis is referred to Symmetry; the Y axis is referred to Location, and $((X^2+y^2)^{0.5})*2$ is referred as Position.

Figure 8:
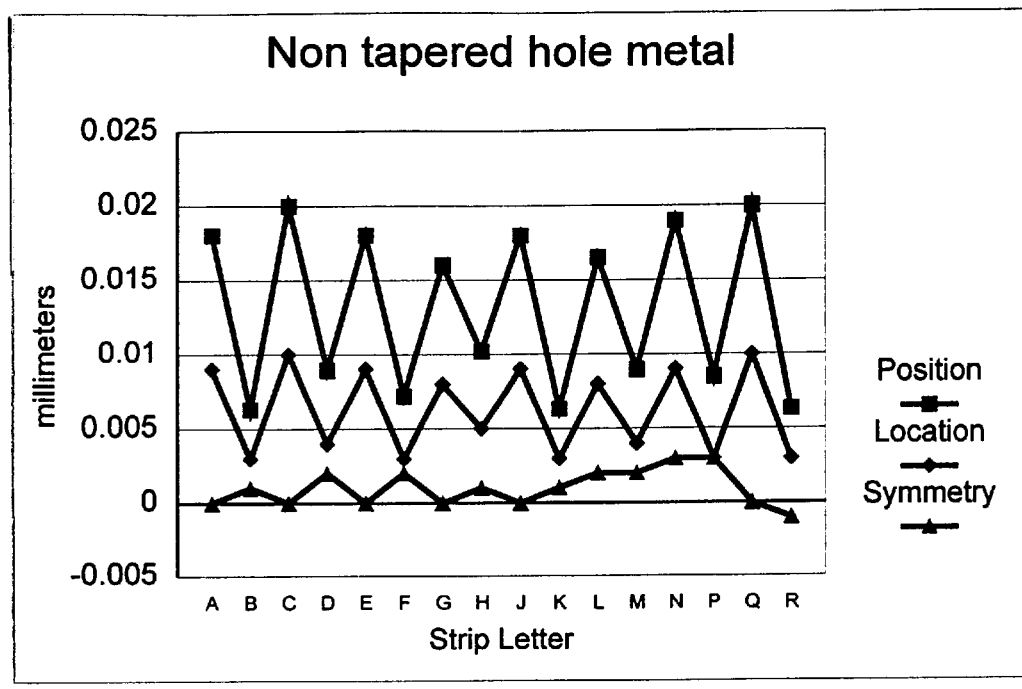
FIG. 8 is a graph illustrating symmetry, location and position data for a prior art processing hole.

FIG. 8 shows the Symmetry, Location and Position data for model QM head suspensions available from Hutchinson Technology, Inc. with non-tapered processing holes in the load beam. Each letter A–R on the horizontal axis corresponds to a strip containing twelve head suspension. Therefore, FIG. 8 contains data for a total of 192 head suspension. One measurement is taken for each head suspension. Each data point is an average of the twelve measurements taken for a given strip. The Position data on the sample with non-tapered processing holes vary from about 0.006 millimeters to about 0.020 millimeters.

Figure 9:
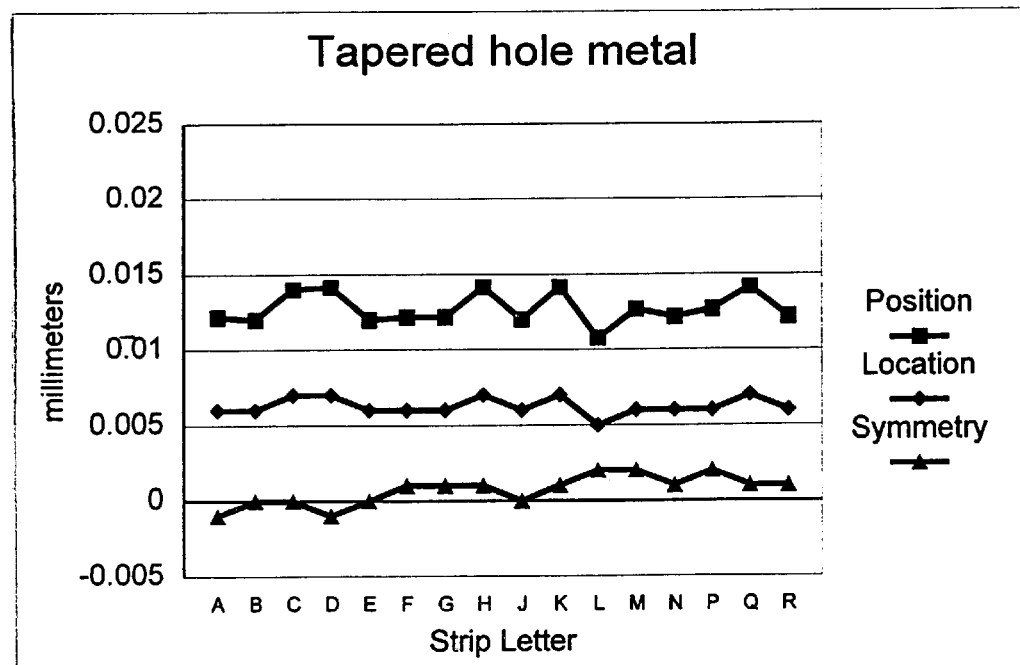
FIG. 9 is a graph illustrating symmetry, location and position data for a tapered processing hole in accordance with the present invention.

FIG. 9 shows the Symmetry, Location and Position data for the same model QM head suspensions available from Hutchinson Technology, Inc. with tapered processing holes in the load beam. Each letter A–R on the horizontal axis corresponds to a strip containing twelve head suspension. One measurement is taken for each head suspension. Each data point is an average of the twelve measurements taken for a given strip. The Position data on the sample with tapered processing holes show a lower level of variability in the range of about 0.011 millimeters to about 0.014 millimeters. The tapered processing holes lower the variability in the Position data.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension for a rigid disk drive comprising:
   a load beam having a mounting region, a rigid region and a spring region located between the mounting region and rigid region, and
   one or more etched, tapered processing holes in the load beam.

2. The head suspension of claim 1 wherein the tapered processing hole comprises one or more tapered processing holes located in the rigid region.

3. The head suspension of claim 1 wherein the head suspension includes a flexure comprising one or more tapered processing holes.

4. The head suspension of claim 1 wherein the tapered processing hole comprises one or more tapered processing holes located in the mounting region.

5. The head suspension of claim 1 wherein the tapered processing hole comprises one or more tapered processing holes in the spring region.

6. The head suspension of claim 1 wherein the tapered processing hole comprises a first diameter at a first surface of the load beam and a second diameter at a second surface of the load beam, wherein the first diameter is less than the second diameter.

7. The head suspension of claim 1 wherein the tapered processing hole comprises a processing hole formed by simultaneously etching a first surface and a second surface of the load beam.

8. The head suspension of claim 1 wherein the tapered processing hole comprises side wall forming an angle with respect to a first surface of the load beam of less than about 85 degrees.

9. The head suspension of claim 1 wherein the tapered processing hole comprises side wall forming an angle with respect to a first surface of the load beam of about 75 degrees to about 85 degrees.

10. A head suspension for a rigid disk drive comprising:
   a load beam having a mounting region, a rigid region and a spring region, located between the mounting region and rigid region and
   one or more tapered processing holes in a flexure.

11. The flexure of claim 10 wherein the tapered processing hole comprises a first diameter at a first surface of the flexure and a second diameter at a second surface of the flexure, wherein the first diameter is less than the second diameter.

12. A method of processing a head suspension for a rigid disk drive comprising the steps of:
   providing a head suspension comprising a load beam having a mounting region, a rigid region and a spring region located between the mounting region and rigid region, the head suspension having at least one etched, tapered processing hole comprising a first diameter at a first surface of the load beam and a second diameter at a second surface of the load beam, wherein the first diameter is less than the second diameter; and
   operatively engaging a processing device with the tapered processing hole.

13. The method of claim 12 wherein the step of operatively engaging the processing device comprises the step of inserting a processing tool through the first surface into the tapered processing hole.

14. The method of claim 13 wherein the processing tool comprises a tapered processing tool.

15. The method of claim 12 wherein the step of operatively engaging a processing device comprises the step of operating a machine vision system to determine a center of the tapered processing hole.

16. The method of claim 12 comprising the step of forming the tapered processing hole by simultaneously etching the first surface and the second surface of the load beam.

17. The method of claim 12 comprising the step of locating a photo mask along the first and second surfaces of the load beam prior to etching the tapered processing hole.

18. The method of claim 12 comprising the step of aligning another component to the head suspension relative to the location of the tapered processing hole.

19. The method of claim 12 comprising the step of aligning a tapered processing hole on another component relative to the tapered processing hole on the load beam.

20. The method of claim 12 comprising the step of aligning a tapered processing hole on a flexure relative to the tapered processing hole on the load beam.

21. The method of claim 12 comprising the step of operatively engaging a plurality of processing devices with a plurality of tapered processing holes.

22. The method of claim 12 comprising the steps of:
   aligning the tapered processing hole with a processing device on a feature forming tool; and
   forming a feature in the load beam.

23. The method of claim 22 wherein the step of forming a feature comprises forming a dimple in the load beam.

24. A method of processing a flexure for a head suspension in a rigid disk drive comprising the steps of:
   providing a flexure having at least one tapered processing hole comprising a first diameter at a first surface of the flexure and a second diameter at a second surface of the flexure, wherein the first diameter is less than the second diameter; and
   operatively engaging a processing device with the tapered processing hole.

25. The method of claim 24 wherein the step of operatively engaging the processing device comprises the step of inserting a processing tool through the first surface into the tapered processing hole.

26. The method of claim 24 wherein the step of operatively engaging a processing device comprises the step of operating a machine vision system to determine a center of the tapered processing hole.

27. The method of claim 24 comprising the step of forming the tapered processing hole by simultaneously etching the first surface and the second surface of the flexure.

28. The method of claim 24 comprising the step of aligning a tapered processing hole on a load beam relative to the tapered processing hole on the flexure.

29. A head suspension for a rigid disk drive comprising:
   a load beam having a mounting region, a rigid region and a spring region located between the mounting region and rigid region, and
   one or more tapered processing holes in the rigid region.

30. A head suspension for a rigid disk drive comprising:
   a load beam having a mounting region, a rigid region and a spring region located between the mounting region and rigid region, and
   one or more tapered processing holes in the spring region.

* * * * *